United States Patent [19]
Denham et al.

[11] Patent Number: 5,997,146
[45] Date of Patent: Dec. 7, 1999

[54] REFLECTOR

[75] Inventors: Edward C Denham, Burgess Hill; Raymond J. Bridgwater, Worthing; Gerald A. Furlong, Rustington; Anthony Nordberg, Midhurst, all of United Kingdom

[73] Assignee: Thomson Training & Simulation Limited, West Sussex, United Kingdom

[21] Appl. No.: 09/051,981

[22] PCT Filed: Oct. 23, 1996

[86] PCT No.: PCT/GB96/02596

§ 371 Date: Aug. 18, 1998

§ 102(e) Date: Aug. 18, 1998

[87] PCT Pub. No.: WO97/15847

PCT Pub. Date: May 1, 1997

[30] Foreign Application Priority Data

Oct. 26, 1995 [GB] United Kingdom ............... 9521948

[51] Int. Cl.⁶ ....................................... G02B 5/08
[52] U.S. Cl. ............................. 359/846; 359/849
[58] Field of Search .................................. 359/846, 847, 359/849, 870, 224

[56] References Cited

U.S. PATENT DOCUMENTS

| 4,293,192 | 10/1981 | Bronstein . |
| 4,358,183 | 11/1982 | Whiteford ............... 359/847 |
| 4,422,723 | 12/1983 | Williams et al. . |
| 4,592,717 | 6/1986 | Albert . |
| 4,596,238 | 6/1986 | Bronstein . |
| 5,222,000 | 6/1993 | Adler ..................... 359/847 |

Primary Examiner—Cassandra Spyrou
Assistant Examiner—Euncha Cherry
Attorney, Agent, or Firm—Nixon & Vanderhye P.C.

[57] ABSTRACT

A reflector includes a frame over which is stretched a flexible sheet of reflective material to define a curved reflecting surface of pre-determined geometry. The frame defines arcuate sections portions of which support the sheet and lie on the surface of pre-determined geometry. At least one of the arcuate sections is deformable to displace the respective sheet supporting portion and thereby adjust the tension in the flexible sheet.

22 Claims, 2 Drawing Sheets

REFLECTOR

This application is a 371 of PCT/GB96/02596 filed Oct. 23, 1996.

BACKGROUND OF THE INVENTION

1. Field of the Invention

The present invention relates to a reflector comprising a flexible sheet of reflective material stretched over a frame to define a curved reflecting surface. Particularly, but not exclusively, the invention relates to the shaping of a thin reflective film in the construction of a part spherical, spheroidal or toroidal mirror.

2. Related Art

Reflectors comprising a sheet of reflective material formed into part-spherical and other curved configurations are known. For instance, flight simulators and other optical training systems typically incorporate spherical mirrors which are conventionally produced by stretching a thin reflective film (typically a metallized plastics material) over a support frame which defines the necessary curvature, and then partially evacuating air from one side of the film.

In more detail, conventional methods for constructing such spherical mirrors comprise cutting a sheet of the reflective film into an appropriate shape and then stretching the film over the walls of a rigid support frame the edges of which have the appropriate curvature (i.e. lie on the desired curved surface). The edges of the film are sealed with respect to the frame so that the film and the frame together form a substantially air-tight chamber. The shaping of the mirror is then completed by partially evacuating the chamber so that the thin film assumes the desired spherical configuration, i.e. the film is sucked into the chamber forming a surface corresponding to a segment of a sphere. The same method can be used to construct mirrors with other curved geometries.

A problem with such methods of construction is that distortion can be introduced in regions towards the edges of the reflective film resulting from the need to support the film such that it has the necessary curvature in two orthogonal directions.

For instance, in the construction of spherical mirrors for use in the off-axis optical systems of flight simulators, the film of flexible material is initially cut into the shape of a blank for a frustum of a cone, having two relatively long side edges and two relatively short end edges. When mounting the film to its support frame, the relatively long edges are fixed to side walls of the frame first so that they are wrinkle free but without introducing significant tension into the film. The film will readily accept the curvature imposed by securing the two side edges of the film to the side walls of the mounting frame. Indeed the film is typically obtained from a roll and so will already have a tendency to curl in one direction.

The distortion referred to above is a result of the need to secure end edges of the film to end walls of the support frame, the edges of which curve in a direction substantially orthogonal to the direction of curvature of the edges of the side walls of the support frame. That is, initially (once the side edges of the film have been secured to the support frame) the end edges of the film will form a chord extending between the side walls of the support frame. To secure the end edges of the film to the support frame the film must be stretched onto its end walls. This stretching process can introduce areas of tension and/or looseness into the film which result in the distortion of the film at its edges once the chamber has been evacuated to produce the desired mirror shape. Clearly any such distortion will have an adverse effect on the performance of the mirror.

To obviate this problem, spherical mirrors are often made to a size larger than is actually required and the distorted regions are simply masked off or otherwise hidden.

An alternative solution to this problem is proposed in U.S. Pat. No. 4,592,717. This discloses apparatus comprising a support frame generally as described above but wherein the end edges of the film are mounted to the end walls of the support frame using flexible stretching members. The stretching members are initially straight (following the chords defined by the end edges of the film as mentioned above) but are subsequently bent to match the curvature of the edges of the end walls of the support frame. As the stretching members are bent they force the end edges of the reflective film onto the end walls of the frame to which they are then clamped. According to this U.S. patent, the configuration and positioning of the stretching members is such that as they are bent they stretch the film slightly beyond its yield point and in such a way as to eliminate the irregularities in tension that would otherwise cause distortion in the film.

In another known method for forming curved mirrors, a support frame substantially as described above is provided with extensions to its side walls which extend beyond the frame end walls and are closed off by secondary end walls. The film is cut larger than required and is initially mounted to the frame with its end edges secured to the secondary end walls so that the film extends beyond the frame end walls which define the desired size and curvature of the mirror. A curved former, having the same profile as the frame end walls, is then used to force (and thus stretch) the film onto the frame end walls and clamp it thereto. The extension sections can be either left in place or removed if desired.

SUMMARY OF THE INVENTION

It is an object of the present invention to obviate or mitigate the problems discussed above.

According to a first aspect of the present invention there is provided a reflector comprising a frame and a flexible sheet of reflective material which is stretched over the frame to define a curved reflecting surface of predetermined geometry, the frame defining arcuate sections portions of which support the sheet and lie on the surface of predetermined geometry, wherein at least one of the arcuate sections is deformable to displace the respective sheet supporting portion and thereby adjust the tension in the flexible sheet.

With the present invention the (or each) deformable arcuate section can, for instance, be deflected with the reflector in situ to adjust the tension in the reflective sheet to improve the performance of the reflector. Moreover the (or each) deformable arcuate section of the support frame can be deflected to allow the flexible sheet to be attached thereto substantially without stretching the flexible sheet, and then subsequently moved to a position on the desired curved surface, stretching the flexible sheet into the required configuration in the process. Stretching the flexible sheet in this way after it has been fixed to the frame is a convenient way of stretching the sheet into the required shape whilst minimising irregularities in the tension in the sheet to reduce distortion.

Thus, according to a second aspect of the present invention there is provided a method of forming a reflector with a curved surface of predetermined geometry, the method comprising stretching a flexible sheet of reflective material over a frame which defines arcuate sections portions of which support the sheet and lie on the curved surface, wherein the respective sheet supporting portion of at least one of the arcuate sections is initially displaced to allow the reflective sheet to be attached thereto substantially without stretching the sheet in the direction of the curved surface, whereafter the displaced sheet supporting portion is moved to a position on the curved surface thereby stretching the sheet as it moves.

The method may include the additional steps of partially evacuating the chamber formed by the frame with the flexible sheet mounted thereto to draw the flexible sheet into the desired curved surface and then displacing the sheet supporting portion of at least one of said arcuate sections to thereby adjust the tension in the flexible sheet.

In a preferred embodiment of the invention, the frame defines four of said arcuate sections at least two of which are deformable. All four arcuate sections may be deformable in which case the support frame preferably comprises a lattice structure which supports said arcuate sections. Such a lattice structure may have a relatively light weight construction which is advantageous where the reflector is intended for use in applications in which manoeuvrability is important.

The reflector may include means for displacing the sheet supporting portion of the or each deformable arcuate section. Such displacing means may, for instance, comprise a relatively rigid member which extends adjacent a respective deformable arcuate section, and a plurality of jacking means which extend between said relatively rigid member and the deformable arcuate section, such that suitable operation of the jacking means displaces the sheet supporting portion of the deformable arcuate member towards or away from the relatively rigid member.

The jacking means may, for example, comprise jacking screws which extend through the respective deformable arcuate section and engage said relatively rigid member.

The reflecting surface may have any desired curved geometry and may curve in two orthogonal directions, for instance forming part of the surface of a sphere, a spheroid, or a toroid.

BRIEF DESCRIPTION OF THE DRAWINGS

Specific embodiments of the present invention will now be described, by way of example only, with reference to the accompanying drawings, in which.

DETAILED DESCRIPTION OF EXEMPLARY EMBODIMENTS

Figure 1:
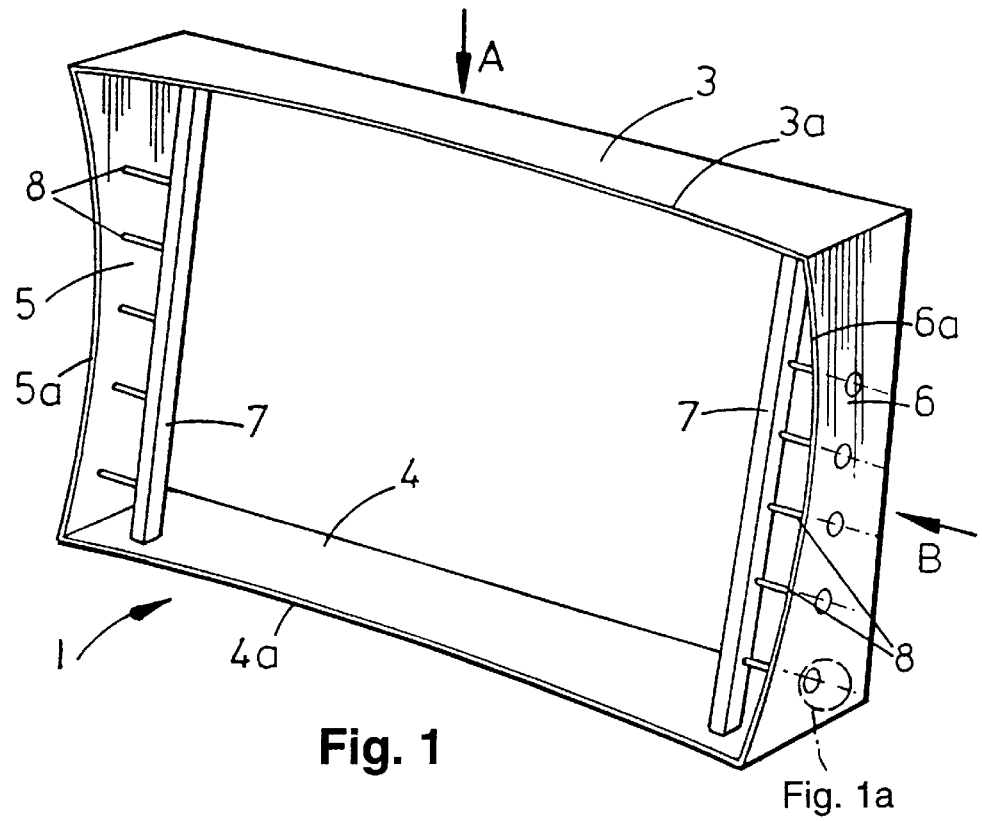
FIGS. 1 and 1a are is a perspective view of a thin film mirror support frame in accordance with the present invention.

Referring to the drawings, the embodiment of the invention illustrated in FIGS. 1 to 6 is a part spherical mirror intended for use in an off axis collimation system of a flight simulator (or similar trainer) and is thus shaped accordingly. The mirror comprises a support frame, indicated generally by the reference 1, to which is mounted a thin flexible reflective film 2 of a metallized plastics material.

The support frame I comprises relatively long side support walls 3 and 4 connected at their ends by relatively short end support walls 5 and 6. The upper edges 3a, 4a, 5a and 6a respectively of the side walls 3, 4, 5 and 6 are arcuate and all lie on the desired spherical surface. i.e. the arcuate edges 3a, 4a, 5a and 6a each have the same centre and radius of curvature. Because the mirror is intended for use in an off-axis collimation system the side wall edges 3a and 4a define sections of latitudinal small circles of the spherical surface and the end wall edges 5a and 6a define sections of longitudinal great circles.

Figure 1A:
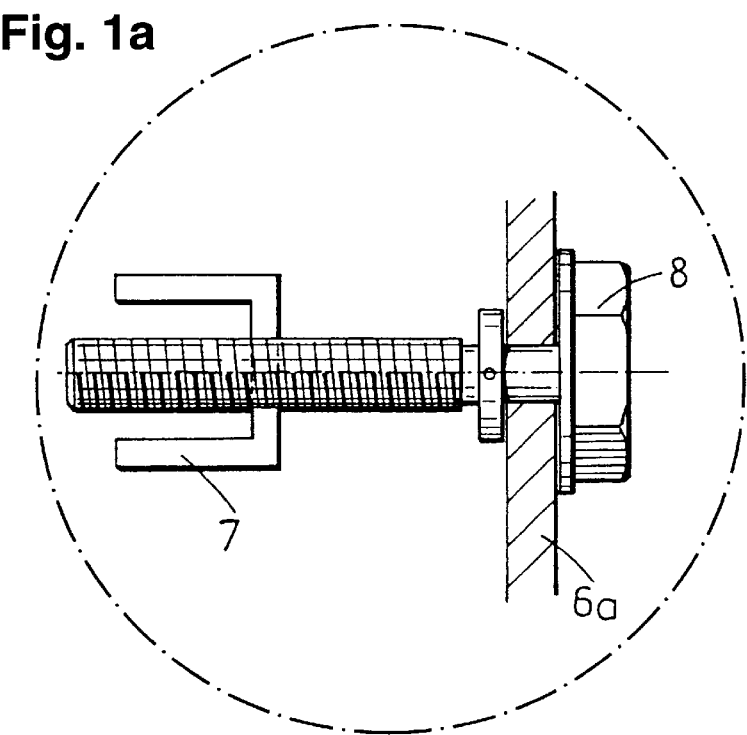
Figure 2:
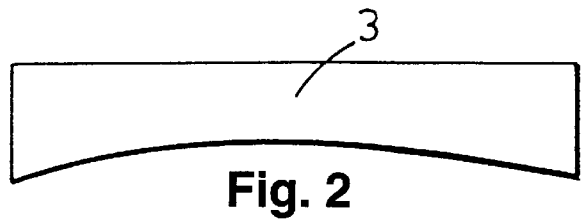
FIGS. 2 and 3 are side and end elevations of the support frame of FIG. 1 looking in the directions of arrows A and B respectively.
Figure 3:
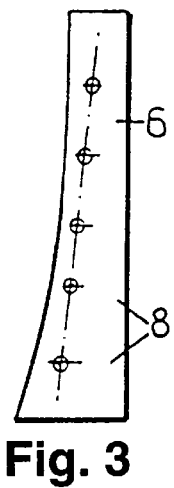
Figure 5:
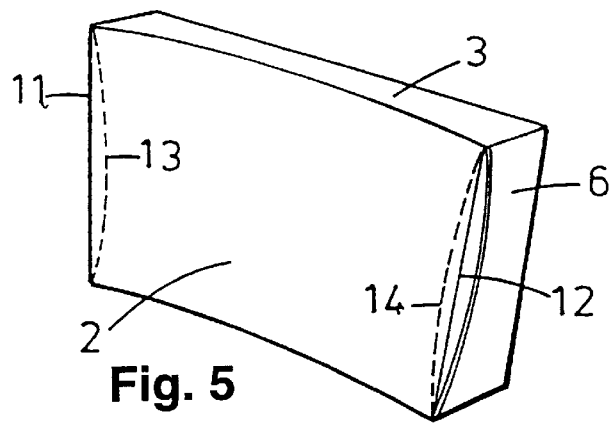
FIG. 5 is a perspective view showing the thin film of FIG. 4 partially mounted to the support frame of FIG. 1.

The side walls 3 and 4 are constructed from a relatively rigid material whereas the end walls 5 and 6 are constructed from a deformable material. Rigid U-sectioned cross members 7 extend between the side walls 3 and 4 adjacent the end walls 5 and 6 respectively. Each of the end walls 5 and 6 is connected to a respective cross member 7 by a series of jacking screws 8. Details of a jacking screw 8 are shown in the FIG. 1a. In the illustrated mirror the jacking screws 8 are equi-spaced, it will however be appreciated that the spacing could vary. For instance, the jacking screws 8 could have reduced spacing towards the middle of the respective walls.

The arrangement is such that by suitable adjustment of the jacking screws 8, the end walls 5 and 6 can be deflected towards or away from the respective cross member 7. Furthermore, the degree of deflection can be independently adjusted at the site of each individual jacking screw 8.

Figure 4:
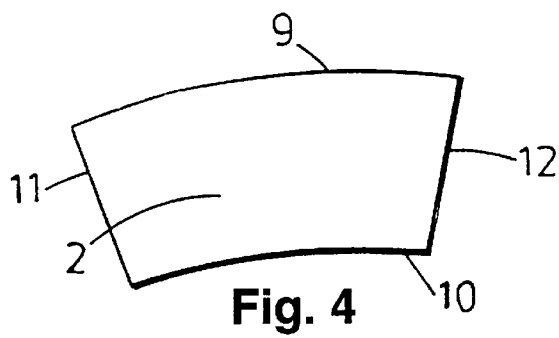
FIG. 4 is a plan view of a sheet of thin reflective film cut for mounting to the support frame of FIG. 1.

In preparation for mounting to the support frame 1, the reflective film 2 is first cut to an appropriate shape, which in this case is that of a blank of a part frustrum of a cone as illustrated in FIG. 4. The sheet of reflective film 2 as illustrated has relatively long side edges 9 and 10 and relatively short end edges 11 and 12. The length of the side edges 9 and 10 corresponds to the circumferential length of the arcuate edges 3a and 4a of the frame side walls 3 and 4 respectively.

The reflective film 2 is mounted to the support frame 1 by first stretching it over the side walls 3 and 4 and securing its edges 9 and 10 to the side wall edges 3a and 4a. This is readily done without introducing wrinkles or any irregular tension into the reflective film 2 which might cause distortions in the curvature of the surface. At this stage, the edges 11 and 12 of the reflective film 2 extend between the side walls 3 and 4 of the support frame 1 along chordal lines extending between the opposite ends of each edge 5a and 6a respectively (see FIG. 5). To complete the mounting of the reflective film 2 to the support frame 1, the edges 11 and 12 of the film 2 have to be secured to the arcuate edges 5a and 6a respectively. However, in forcing the edges 11 and 12 of the film 2 towards the arcuate edges 5a and 6a, the edges 11 and 12 tend to deflect inwards along the paths shown by the dotted lines 13 and 14.

Figure 6:
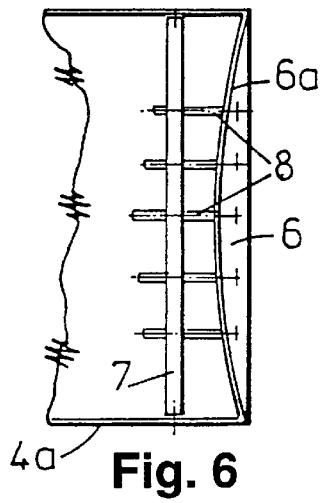
FIG. 6 illustrates one end of the support frame of FIG. 1 configured for mounting the thin film thereto.

To take account of this deviation from the desired shape, the edges 5a and 6a of the deformable side walls 5 and 6 respectively are deflected inwards to take up the path shown by the dotted lines 13 and 14 by appropriate adjustment of the jacking screws 8, as illustrated in FIG. 6 (which shows one end only of the frame and with the film removed). This allows the end edges 11 and 12 to be secured to the support wall edges 5a and 6a substantially without stretching the film. The side walls 5 and 6 are then returned to their original position (which defines the desired curvature of the mirror) again by appropriate adjustment of the jacking screws 8. Formation of the mirror is completed by partially evacuating the air from the chamber formed by the support frame 1 and reflective film 2.

The apparatus thus stretches the film as required after it has been mounted to the end walls 5 and 6, and in such a way as to tension the film so that distortion is minimised in the completed mirror. Any errors in the shape of the mirror through any initial inaccuracy in adjustment of the support frame end walls 5 and 6 can be corrected once the mirror is in situ by further adjustment of the jacking screws 8 to adjust the tension in the film 2 whilst testing the performance of the mirror.

The present invention thus provides a mirror assembly which simplifies the process of stretching the reflective film over the supporting frame and allows for accurate adjustment of the tension in the film to minimise distortions near the edges of the mirror.

It will be appreciated that the shape and configuration of the support frame 1 may vary widely depending upon the desired shape and curvature of the mirror. For instance, the mirror could be part spheroidal or part toroidal.

It will further be appreciated that details of the jacking screws 8 and of the cross members 7 may be varied, as may the exact number and positioning of the jacking screws. For instance, the cross members 7 could be curved to match the curvature of the end wall edges 5*a* and 6*a*. Similarly, it will be appreciated that a variety of means and methods could be devised to deflect the walls 3 and 4.

Figure 7:
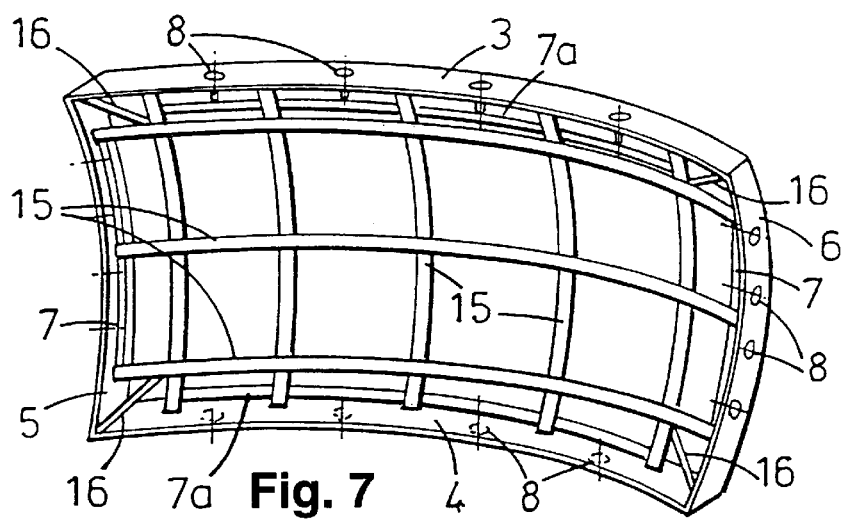
FIG. 7 illustrates a support frame in accordance with a second embodiment of the present invention.

Whereas in the embodiment described above, the side walls 3 and 4 are relatively rigid, these may be replaced with flexible walls and corresponding jacking assemblies similar to those of the end walls 5 and 6. This would allow the tension in the reflective film 2 in the regions of its longer edges 9 and 10 to be adjusted in situ to improve the performance of the mirror. For instance, a second embodiment of the invention which has flexible side walls 3 and 4 as well as flexible end walls 5 and 6 is illustrated in FIG. 7. Because the tension in all four walls can be adjusted after the mirror film has been mounted to the support frame, the support frame can be constructed with a light-weight flexible construction.

Thus, referring to FIG. 7 (and using the same reference numerals as above where appropriate) the illustrated support frame 1 comprises a lattice structure of light-weight tubes 15 which themselves support the four support walls 3, 4, 5 and 6. The corners of the frame must be maintained in a fixed position and this is achieved by rigid corner stays 16. Rigid longitudinal and latitudinal cross members 7 and 7*a* are provided to receive jacking screws 8 from the end walls 5 and 6 and side walls 3 and 4 respectively. A light-weight flexible sheet material, similar to the mirror film, may be used to close the back of the support frame 1 so that the required closed chamber is formed once the mirror film 2 has been mounted to the support frame 1.

In use, when the mirror chamber is evacuated the flexible walls will tend to deflect inwards. The jacking screws can then be used to adjust the walls to the correct position, under the evacuated conditions, to give the desired mirror shape with minimal distortion around its edges. When the mirror is not in use, and thus the pressure within the chamber increases, the structure will relax but will once again assume the correct configuration when next used and the chamber is evacuated.

A light-weight support frame such as that illustrated in FIG. 7 has significant advantages over heavier rigid conventional support frames in applications where movement of the mirror is required, as is typical in training systems.

It will be appreciated that the detailed structure of the support lattice may be varied, as may the overall configuration of the mirror depending upon its intended application.

It will also be understood that the present invention is not restricted to the construction of optical mirrors but extends to other types of reflector.

What is claimed is:

1. A reflector comprising:

a frame and a flexible sheet of reflective material which is stretched over the frame to define a curved reflecting surface of predetermined geometry, the frame defining arcuate sections, portions of which support the sheet and lie on the surface of predetermined geometry, wherein at least one of the arcuate sections is selectively deform to displace the respective sheet supporting portion towards and away from the interior of the frame and thereby adjust the tension in the flexible sheet.

2. A reflector as in claim 1, wherein the curved reflecting surface curves in two orthogonal directions.

3. A reflector as in claim 1 wherein the frame defines four of said arcuate sections at least two of which are deformable.

4. A reflector as in claim 3, wherein all four arcuate sections are deformable.

5. A reflector as in claim 1 wherein said frame comprises a lattice structure which supports said arcuate sections.

6. A reflector according to claim 1 wherein means are provided for displacing the sheet supporting portion of said at least one deformable arcuate section.

7. A reflector as in claim 6, wherein each means for displacing comprises:

a relatively rigid member which extends adjacent a respective deformable arcuate section, and a plurality of jacking means which extend between said relatively rigid member and the deformable arcuate section, such that operation of the jacking means displaces the sheet supporting portion of the deformable arcuate member towards or away from the relatively rigid member.

8. A reflector as in claim 7 wherein each jacking means comprises:

a jacking screw which extends through the respective deformable arcuate section and engages said relatively rigid member.

9. Apparatus as in claim 1 wherein the curved surface is part of a sphere, a spheroid, or a toroid.

10. A method of forming a reflector with a curved surface of predetermined geometry, the method comprising:

stretching a flexible sheet of reflective material over a frame which defines arcuate sections portions of which support the sheet and lie on the curved surface, initially displacing the respective sheet supporting portion of at least one of the arcuate sections towards the interior of the frame to allow the reflective sheet to be attached thereto substantially without stretching the sheet in the direction of the curved surface, and thereafter moving the displaced sheet supporting portion to a position on the curved surface thereby stretching the sheet as it moves.

11. A method as in claim 10, wherein the frame with said flexible sheet mounted thereto together form a chamber and the method comprises the additional steps of:

partially evacuating said chamber to draw the flexible sheet into the desired curved surface, and then displacing the sheet supporting portion of at least one of said arcuate sections to thereby adjust the tension in the flexible sheet.

12. A method as in claim 10 or 11, wherein the curved surface curves in two orthogonal directions.

13. A reflector comprising:

a frame having edges which define arcuate convex sections on the circumference of a predetermined geometrical surface having two dimensions of curvature;

a flexible sheet of reflective material stretched over said edges of the frame; and at least one of said edges being adjustable in a circumferential direction that is generally parallel to the stretched sheet surface to thereby facilitate initial attachment of the sheet thereto and subsequent adjustment of tension in the stretched sheet.

14. A reflector as in claim 13 wherein:

the frame has four outer edges and two opposing ones of said outer edges are adjustable in said circumferential direction.

15. A reflector as in claim 13 wherein said at least one adjustable edge includes:

a plurality of spaced-apart adjustment fixtures distributed therealong to facilitate effecting different magnitudes adjustment along the associated edge.

16. A reflector as in claim 14 wherein each said adjustable edge includes:

a plurality of spaced-apart adjustment fixtures distributed therealong to facilitate effecting different magnitudes adjustment along the associated edge.

17. A reflector as in claim 15 wherein:

two opposing edges of said frame are rigid and are interconnected by a rigid structure to which said adjustment fixtures are adjustably connected.

18. A method of forming a reflector, said method comprising:

providing a frame having edges which define arcuate convex sections on the circumference of a predetermined geometrical surface having two dimensions of curvature;

stretching a flexible sheet of reflective material over said edges of the frame; and initially adjusting at least one of said edges in a circumferential direction that is generally parallel to the stretched sheet surface to thereby facilitate initial attachment of the sheet thereto; and subsequently adjusting tension in the stretched sheet by further adjusting said at least one edge in a circumferential direction.

19. A method as in claim 18 wherein:

the frame has four outer edges and two opposing ones of said outer edges are adjusted in said circumferential direction.

20. A method as in claim 18 wherein said adjusting steps include:

individually adjusting a plurality of spaced-apart adjustment fixtures distributed along the adjustable edge to facilitate effecting different magnitudes adjustment along the associated edge.

21. A method as in claim 19 wherein said adjusting steps include:

individually adjusting a plurality of spaced-apart adjustment fixtures distributed along the adjustable edge to facilitate effecting different magnitudes adjustment along the associated edge.

22. A method as in claim 20 wherein two opposing edges of said frame are rigid and are interconnected by a rigid structure to which said adjustment fixtures are adjustably connected.

* * * * *